US007188971B2

(12) United States Patent
Wu et al.

(10) Patent No.: US 7,188,971 B2
(45) Date of Patent: Mar. 13, 2007

(54) FLEXIBLE TUBULAR SHAPE DECORATION LAMP

(76) Inventors: Jeng-Shyong Wu, No. 14, Alley 1, Lane 326, Shyr-Piin Road, Hsin-Chu City (TW); Ping-Huang Chang, No. 504-1, Sec. 4, Chung-Hua Road, Hsin-Chu City (TW)

( * ) Notice: Subject to any disclaimer, the term of this patent is extended or adjusted under 35 U.S.C. 154(b) by 135 days.

(21) Appl. No.: 10/792,603

(22) Filed: Mar. 3, 2004

(65) Prior Publication Data

US 2005/0195609 A1 Sep. 8, 2005

(51) Int. Cl.
*F21V 13/00* (2006.01)
*B29C 47/06* (2006.01)
*B32B 33/00* (2006.01)

(52) U.S. Cl. ........................ 362/236; 362/249; 264/64; 264/171.11

(58) Field of Classification Search ................ 362/240, 362/246, 249, 236, 244; 264/64, 171.11
See application file for complete search history.

(56) References Cited

U.S. PATENT DOCUMENTS

| | | | | |
|---|---|---|---|---|
| 3,714,414 | A * | 1/1973 | Sternius | 362/249 |
| 4,271,458 | A * | 6/1981 | George, Jr. | 362/249 |
| 4,607,317 | A * | 8/1986 | Lin | 362/249 |
| 5,057,981 | A * | 10/1991 | Bowen et al. | 362/249 |
| 5,410,459 | A * | 4/1995 | Yang | 362/249 |
| 6,217,194 | B1 * | 4/2001 | Huang | 362/249 |
| 6,367,953 | B1 * | 4/2002 | Lee | 362/249 |
| 6,406,166 | B1 * | 6/2002 | Ko | 362/249 |
| 6,511,206 | B1 * | 1/2003 | Fan Wong | 362/249 |
| 6,595,659 | B2 * | 7/2003 | Wong | 362/252 |
| 2002/0027778 | A1 * | 3/2002 | Ko | 362/249 |

* cited by examiner

*Primary Examiner*—Sandra O'Shea
*Assistant Examiner*—Ismael Negron
(74) *Attorney, Agent, or Firm*—McGlew & Tuttle, PC

(57) ABSTRACT

A lamp string set formed by a plurality of lighting elements which are connected in series, or in series and parallel, a support body receiving the plurality of lighting elements, and cover layer enveloping the lighting elements and the support body with insulator material, with its appearance having shape and pattern as desired.

8 Claims, 2 Drawing Sheets

FLEXIBLE TUBULAR SHAPE DECORATION LAMP

FIELD OF THE INVENTION

This invention relates to a flexible tubular shape decoration lamp, particularly to a flexible tubular shape decoration lamp which can be bent into various shapes as desired, and which can be wound around a frame, tree, display shelf or walls etc. for decoration.

BACKGROUND OF THE INVENTION

In addition to illumination, a lamp can be used for decoration purpose. For example, colorful lamp tubes or lamp-bulb strings are often wound around trees or exhibited goods on national Holidays, such as Christmas and also useful at a lamp festival etc., so as to enhance the aesthetic effect to viewers.

Traditionally, a lamp tube for the above purpose is generally fluorescent lamp wrapped with some transparent papers having different colors or same color, while in the case of lamp-bulb string, it being lamp-bulb strings formed by a plurality of bulbs with different colors or same color connected by electrical wires.

Above lamp tube for decoration purpose, however, is made of glass that has no flexibility. Furthermore, its appearance is usually limited to cylindrical as its sole shape, which is considered monotonous. While in the case of lamp-bulb string formed with bulbs connected by electrical wires, it has flexibility due to the flexibility of wire itself, however, it being out-of-date with its limited fineness and diversities for several decades, which is indistinctive in use.

SUMMARY OF THE INVENTION

Inasmuch as the foregoing status of the prior art, the inventor of this application has developed the inventive flexible tubular shape decoration lamp tube after an intensive and wide research on above-mentioned lamp tube suitable for decoration use.

The flexible tubular shape decoration lamp tube of this invention not only has the advantages of both above-mentioned traditional lamp tube and lamp-bulb string, but also has a diversified appearance to attain an aesthetic effect.

In addition to flexibility itself, the flexible tubular shape decoration lamp tube of this invention is covered with a cover body with its shape as desired on its outer wall, and the adjacent lamp bulbs being interconnected from head to tail in order by a connector to form a tamp tube string. When in use, therefore, lamp tube or lamp tube string can be bent through over various support bodies, e.g., trees, wall etc., and the light emitting from the light tube being permeable through the cover body. The outer surface of said cover layer is formed into irregular and flexible tubular shape, with its size being adjusted as desired, and can be formed into bumpy cahoots according to the shaped of the lamp tube string and the support body. Various colorful light can be emitted transversely along the direction of the lamp string, to enhance aesthetic effect of the decoration lamp tube through the outline of said cover body.

Thus, this invention can provide delicate decoration and lamp-illumination effect, which traditional lamp tube and lamp string fail to attain.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
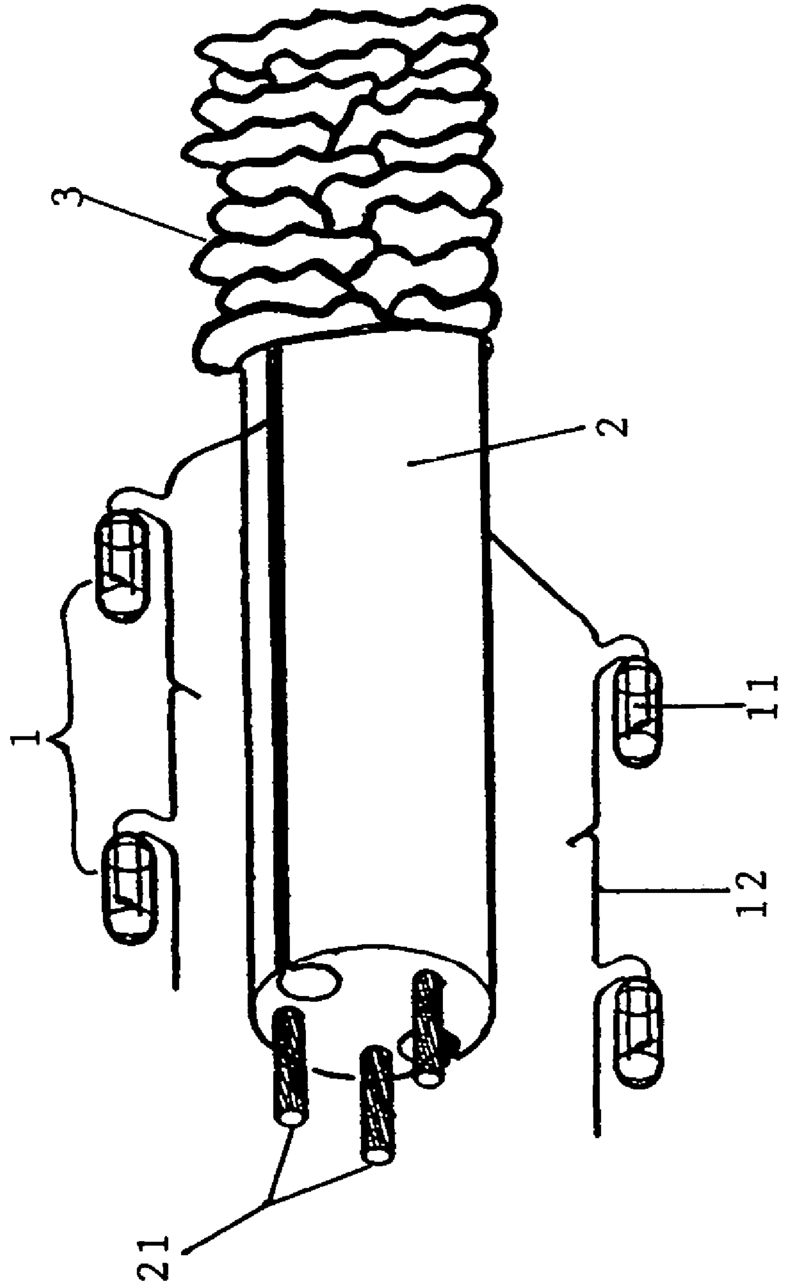
FIG. 1 is a schematic perspective view showing an embodiment of the flexible tubular decoration lamp of present invention.

This invention can be embodied in the way explained below.

This invention provides a flexible tubular shape decoration lamp, comprising lamp string set formed by a plurality of lighting elements which are connected in series or in series and parallel combination by wires; and a support body which insulates and seals the components of said lamp string set by insulator material, providing with a connector at its one or both ends for interconnecting use; and cover layer, formed by insulator material, which surrounds said lamp string set and said support body, with its appearance having shape and pattern as desired. The appearance of said cover layer of this invention is formed into irregular, longitudinal bumpy cahoots, with its size being adjusted as desired, using the same material and color as that of said support body, or using two or more kinds of material with its distribution extending transversely, having two or more kinds of color extending transversely.

On the other hand, this invention provides a method for forming flexible tubular shaped decoration lamp, comprising the steps of:

connecting in series, or in series and in parallel combination by a plurality of wires, so as to connect a plurality of lighting elements into a lamp string set of one or a plurality of circuits;

fixing the components of the lamp string set into said lamp string set in spaced relationship by said support body, or containing said lamp string set within said support body;

extrusion-forming, which is used to extrude, by a plurality of extruding machines, plastic material for cover layer injected into the same die from different direction, so that the lamp string set and the support body is contained within the extrusion with its cover layer being shaped as desired. A plurality of extruding machines can be the machines with same specification with its operating condition either the same or different. A plurality of extruding machines can extrude plastics material with its specification composition and color being the same or different. Furthermore, A plurality of extruding machines inject plastic material into same die from different direction.

The die used in this invention is formed by a multi-layer sleeve with each sleeve-layer having different bore diameter. The lamp string set and the support body pass through the innermost sleeve of the die. The plastic injection direction of the first extruding machine is the draw-out direction of the lamp string set and the support body, while the plastic injection directions of the rest extruding machines are each set at predetermined angle relative to the first extruding machine respectively. The outer layer and the inner layer of the multi-layer sleeve of the die have different center or different specification, and the operating condition being same or different. A plurality of extruding machines can extrude plastics material having same or different specification composition and color.

This invention provides another method for forming flexible tubular shaped decoration lamp, comprising the steps of:

connecting in series, or in series and in parallel combination by a plurality of wires, so as to connect a plurality of lighting elements into a lamp string set of one or a plurality of circuits;

fixing the components of the lamp string set into said lamp string set in spaced relationship by said support body, or containing said lamp string set within said support body;

extrusion-forming, which is used to extrude, by a plurality of extruding machines having the same specification, plastic material for cover layer injected into the same die from different direction, so that the lamp string set and the support body is contained within the extrusion with its cover layer being shaped as desired. The die used is a multi-layer sleeve combined in such a way that its outer layer and the inner layer has different center. The multi-layer sleeve is formed by sleeves each of which has different bore diameter, the lamp sting set and the support body passing through the innermost sleeve of the die, the plastic injection direction of the first extruding machine being the draw-out direction of the lamp string set and the support body, while the plastic injection directions of the rest extruding machines being set at predetermined angle relative to the first extruding machine respectively.

This invention provides still another method for forming flexible tubular shaped decoration lamp, comprising the steps of:

connecting in series, or in series and in parallel combination by a plurality of wires, so as to connect a plurality of lighting elements into a lamp string set of one or a plurality of circuits;

fixing the components of the lamp string set into said lamp string set in spaced relationship by said support body, or containing said lamp string set within said support body;

extrusion-forming, which is used to extrude, by a plurality of extruding machines each of which has different specification, plastic material for cover layer injected into the same die from different direction, so that the lamp string set and the support body is contained within the extrusion with its cover layer being shaped as desired. The die used is a multi-layer sleeve combined in such a way that its outer layer and the inner layer has different center. The multi-layer sleeve is formed by sleeves each of which has different bore diameter, the lamp string set and the support body passing through the innermost sleeve of the die, the plastic injection direction of the first extruding machine being the draw-out direction of the lamp string set and the support body, while the plastic injection directions of the rest extruding machines being set at predetermined angle relative to the first extruding machine respectively.

This invention will be described in more details in reference to the accompanied drawings.

Referring to the drawings in particular, FIG. 1, wherein a schematic perspective view of an embodiment of a flexible tubular shape decoration lamp of present invention is shown. For the sake of clear indication, a segment of the cover layer 3 is stripped from the support body 2 so that a part of the support body 2 can be seen, and the lighting element 11 being moved from the interior of the support body 2 to outside so that the lighting element 11 can clearly be seen.

As shown in FIG. 1, an embodiment of a flexible tubular shape decoration lamp according to present invention is shown. The flexible tubular shape decoration lamp of this invention comprises:

lamp string set 1 which is formed by a plurality of lighting elements 11 connected by wires 12; and a support body 2, which is, cylindrical in shape, being used to envelop and support said lamp string set 1;

and cover layer which can be formed into any shape as desired, e.g. crumple shape as illustrated in the drawing, to cover around said support body 2.

The lighting elements 11 of said lamp string set 1, for example, can be luminescent diodes or small bulbs, which are connected, in series or in parallel and series combination, with each other and supplied with power by electric wires 12. The support body 2 envelops and fixes said lamp string set 1 within it. A connector 21 is provided at both ends of the support body 2, so that the head portion and the tail portion of several support body 2 can be interconnected via said connector 21 into longer lamp string device.

Said cover body 3 is made of insulator material, preferably plastic material. Furthermore, the shape of the inner wall of said cover body 3 is cylindrical for fitting to the outer wall of said support body 2, while the outer wall of the cover body 3 can be any shape or pattern as desired, e.g., crumple pattern as illustrated in drawing.

The cover body 3 is also made of insulator material which can be the same or different insulator material as that of the support body 2. For example, it can be plastic insulator material with fluorescent feature to enhance colorful glittering.

Figure 2B:
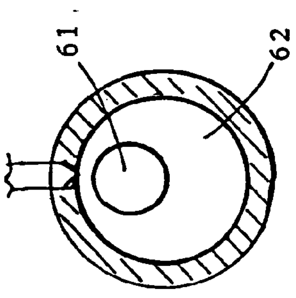
FIG. 2B a sectional view showing the embodiment of the extruding machine of FIG. 2A.
Figure 2A:
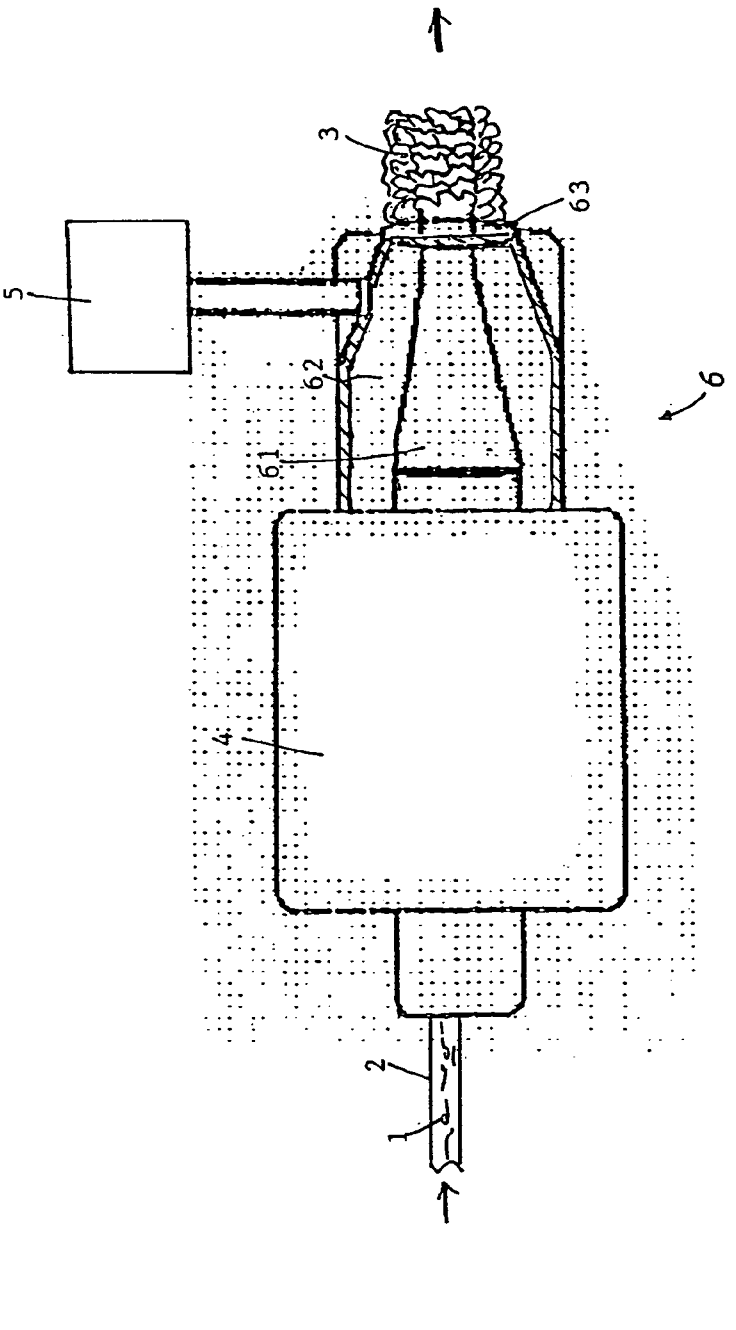
FIG. 2A is a side sectional view showing the embodiment of an extruding machine used for encasing the cover body around the surface of the support body during the manufacturing of the flexible tubular decoration lamp of present invention.

Referring to FIG. 2A and FIG. 2B, an embodiment of a extruding machine used for enveloping the cover body 3 around the surface of the support body 2 during the manufacturing of the flexible tubular decoration lamp of present invention is shown. The extruding machine illustrated in the drawing comprises a first extruding machine 4, second extruding machine 5 and a double-layer tubular die 6, wherein said double-layer tubular die 6 includes a inner-layer tubular die cavity 61, outer-layer tubular die cavity 62 and a double-ring type nozzle 63. Said first extruding machine 4 and second extruding machine 5 inject plastic material for cover layer into the outer-layer tubular die cavity 62 of the die 6, while said inner-layer tubular die cavity 61 is used for guiding the lamp string set 1 and the support body 2 to the double-ring type nozzle 63, so that the plastic material for cover layer is enveloped onto the outer wall of said support body 2.

Based on the foregoing, this invention has been described in reference to the preferred embodiments of this invention. However, this invention is not limited to the above embodiments, any equivalent modification or variation can be made without departing from the spirit and scope of this invention which is well defined in the appended claims.

While specific embodiments of the invention have been shown and described in detail to illustrate the application of the principles of the invention, it will be understood that the invention may be embodied otherwise without departing from such principles.

SYMBOLIC LIST OF COMPONENTS

1 lamp string set
2 support body
3 cover body
4 first extruding machine
5 second extruding machine
6 double-layer tubular die

11 lighting element
12 wire
21 connector
61 inner-layer tubular die cavity
62 outer-layer tubular die cavity
63 double-ring type nozzle

What is claimed is:

1. A method for forming flexible tubular shaped decoration lamp, comprising the steps of:

connecting in one of in series and in series/parallel combination, a plurality of lighting elements by a plurality of wires, to form a lamp string set in at least one circuit;

one of fixing the components of said lamp string set in spaced relationship into a support body and containing said lamp string set within a support body;

extrusion-forming by a plurality of extruding machines a plastic material over the lamp string set and the support body, to form a cover layer having a desired shape, said plastic material being injected into a common die from different directions, wherein said common die is formed by multi-layer sleeves, each of said sleeves having a different bore diameter.

2. A method for forming flexible tubular shaped decoration lamp as claimed in claim 1, wherein said plastic material is a plurality of plastic materials having the same composition.

3. A method for forming flexible tubular shaped decoration lamp as claimed in claim 1, wherein said plastic material is a plurality of plastic materials of the same color.

4. A method for forming flexible tubular shaped decoration lamp as claimed in claim 1, wherein:

the lamp string set and the support body pass through the innermost sleeve of the die, and the plastic material injection direction of a first extruding machine of said plurality of extruding machines is the draw-out direction of the lamp string set and the support body, the plastic material injection direction of a second extruding machine of said plurality of extruding machines is set at a predetermined angle relative to the injection direction of the first extruding machine.

5. A method for forming flexible tubular shaped decoration lamp as claimed in claim 1, wherein the center of the outer layer and the inner layer of the multi-layer sleeves of said die are different.

6. A method for forming flexible tubular shaped decoration lamp as claimed in claim 1, wherein said plastic material is a plurality of plastic materials having different compositions.

7. A method for forming flexible tubular shaped decoration lamp as claimed in claim 1, wherein said plastic material is a plurality of plastic materials of different color.

8. A method for forming flexible tubular shaped decoration lamp, comprising the steps of:

connecting in one of in series and in series/parallel combination, a plurality of lighting elements by a plurality of wires, to form a lamp string set in at least one circuit;

one of fixing the components of said lamp string set in spaced relationship into a support body and containing said lamp string set within a support body;

extrusion-forming by a plurality of extruding machines a plastic material over the lamp string set and the support body, to form a cover layer having a desired shape, said plastic material being injected into a common die from different directions, said common die being formed by a multi-layer sleeve, each layer having different bore diameter, the lamp string set and the support body passing through the innermost sleeve of the die, and the plastic material injection direction of a first extruding machine being the draw-out direction of the lamp string set and the support body, while the plastic material injection directions of the rest of the extruding machines being set at predetermined angle relative to the injection direction of the first extruding machine respectively.

* * * * *